United States Patent
Huang et al.

(10) Patent No.: US 10,753,781 B2
(45) Date of Patent: Aug. 25, 2020

(54) THREE-DIMENSIONAL PRINTING DEVICE

(71) Applicants: XYZprinting, Inc., New Taipei (TW); Kinpo Electronics, Inc., New Taipei (TW)

(72) Inventors: Chen-Fu Huang, New Taipei (TW); An-Hsiu Lee, New Taipei (TW); Ching-Yuan Chou, New Taipei (TW); Tsai-Yi Lin, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 213 days.

(21) Appl. No.: 16/132,489

(22) Filed: Sep. 17, 2018

(65) Prior Publication Data

US 2019/0368913 A1 Dec. 5, 2019

(30) Foreign Application Priority Data

May 31, 2018 (CN) .......................... 2018 1 0553065

(51) Int. Cl.
*G01F 23/296* (2006.01)
*B33Y 30/00* (2015.01)
*B33Y 40/00* (2020.01)
*G01F 23/292* (2006.01)

(52) U.S. Cl.
CPC ............ *G01F 23/296* (2013.01); *B33Y 30/00* (2014.12); *B33Y 40/00* (2014.12); *G01F 23/292* (2013.01)

(58) Field of Classification Search
CPC ..... G01F 23/296; G01F 23/292; B33Y 30/00; B33Y 40/00
USPC .......................................................... 73/291
See application file for complete search history.

(56) References Cited

U.S. PATENT DOCUMENTS

| | | | |
|---|---|---|---|
| 10,144,206 B2 * | 12/2018 | Fromm .................... | B24B 31/06 |
| 2015/0321421 A1 * | 11/2015 | Ding ...................... | B29C 64/393 |
| | | | 264/401 |
| 2016/0089839 A1 * | 3/2016 | Huang ................... | B29C 64/135 |
| | | | 425/147 |
| 2017/0129169 A1 * | 5/2017 | Batchelder ............. | B33Y 30/00 |
| 2018/0326661 A1 * | 11/2018 | Johnson ................ | B29C 64/259 |
| 2019/0054696 A1 * | 2/2019 | Alonso ................... | B29C 64/35 |
| 2019/0105841 A1 * | 4/2019 | Zamorano ............. | B29C 64/255 |
| 2019/0299530 A1 * | 10/2019 | Hill ......................... | B65D 90/00 |
| 2020/0130278 A1 * | 4/2020 | Swier .................... | B29C 64/314 |

* cited by examiner

*Primary Examiner* — Nathaniel T Woodward
(74) *Attorney, Agent, or Firm* — JCIPRNET

(57) ABSTRACT

A three-dimensional printing device including a body, a tank, an origin target, a sensor, and a control module is provided. The tank is rotatably assembled on the body, and the tank is filled with a liquid forming material. The origin target is disposed on the tank and rotates along with the tank. The sensor is disposed on the body and located above the liquid forming material to sense a liquid level of the liquid forming material. The control module electrically connects the tank and the sensor and drives the tank to rotate. The sensor is located above a rotation path of the origin target, and the control module senses the origin target through the sensor and positions a rotation origin of the tank.

11 Claims, 6 Drawing Sheets

THREE-DIMENSIONAL PRINTING DEVICE

CROSS-REFERENCE TO RELATED APPLICATION

This application claims the priority benefit of China application serial no. 201810553065.7, filed on May 31, 2018. The entirety of the above-mentioned patent application is hereby incorporated by reference herein and made a part of this specification.

BACKGROUND

1. Technical Field

The present disclosure relates to a three-dimensional printing device.

2. Description of Related Art

With the increasing technical progress, different methods for constructing a physical three-dimensional (3-D) model by using an additive manufacturing technology such as layer-by-layer modeling have been proposed one after another. Generally speaking, the additive manufacturing technology refers to: converting design data of a 3D model constructed through software such as computer-aided design (CAD) to a plurality of thin (quasi-two-dimensional) cross section layers stacked successively.

Multiple modes capable of forming a plurality of thin cross section layers have been developed currently. For example, photopolymer serves as a liquid forming material used for most of three-dimensional printing devices, a moving platform is disposed in the liquid forming material, and an X-Y-Z coordinate, constructed according to the design data of a 3D model, drives a light source to movably irradiate the liquid forming material along X-Y coordinates, so as to solidify the liquid forming material into a correct cross section layer shape. Then, as the moving platform moves along a Z axis, the liquid forming material may form a three-dimensional object on the moving platform under the layer-by-layer solidification and stacking state.

However, it is necessary to respectively monitor the reserves of liquid forming materials stored in a tank and the rotation state of the tank in a three-dimensional printing process, the former may avoid shortage of liquid forming materials in the three-dimensional printing process, and the latter enables the formed three-dimensional object to be smoothly disengaged from the tank by adjusting the position of the tank through a rotation motion, or avoids a situation where concentrated loss is easily caused by three-dimensional printing of the tank in repeated areas.

SUMMARY

The present disclosure is directed to a three-dimensional printing device, which not only senses a height of level of a liquid forming material in a tank with a sensor, but also can identify and position an origin of the tank with the sensor.

According to an embodiment of the present disclosure, a three-dimensional printing device includes a body, a tank, an origin target, a sensor, and a control module. The tank is rotatably assembled on the body, and the tank is filled with a liquid forming material, and a height of level of the liquid forming material in the tank is within a variable range. The origin target is disposed on the tank and rotates along with the tank, and a height of the origin target relative to the tank is beyond the variable range of the height of level of the liquid forming material. The sensor is disposed on the body and located above the liquid forming material to sense the height of level of the liquid forming material. The control module electrically connects the tank and the sensor and drives the tank to rotate. The sensor is located above a rotation path of the origin target, and the control module senses the origin target through the sensor and positions a rotation origin of the tank.

Based on the foregoing, according to the three-dimensional printing device, the origin target is disposed on the tank and accordingly rotates along with the tank, and the height position of the origin target on the tank is beyond the variable range of the height of level of the liquid forming material. Meanwhile, the sensor is also disposed above the liquid forming material and is located above the rotation path of the origin target. In this way, not only the sensor senses the height of level of the liquid forming material in the tank, but also the origin target can be sensed when passing through a place below the sensor. Therefore, the control module can identify the origin position of the tank, which is thus taken as a reference for further rotation control over the tank. The three-dimensional printing device can hereby meet the requirements for sensing the height of level of a liquid forming material and positioning a tank by using the same sensor.

BRIEF DESCRIPTION OF THE DRAWINGS

The accompanying drawings are included to provide a further understanding of the present invention, and the accompanying drawings fall within the present specification and constitute a part of the present specification. The accompanying drawings describe the embodiments of the present invention, and are used to explain the principle of the present invention together with the descriptions.

DESCRIPTION OF THE EMBODIMENTS

Examples of exemplary embodiments of the present invention will be described in the accompanying drawings by referring to the exemplary embodiments of the present invention in detail. The same element symbols are used to indicate the same or similar parts in the accompanying drawings and the descriptions whenever possible.

Figure 1:
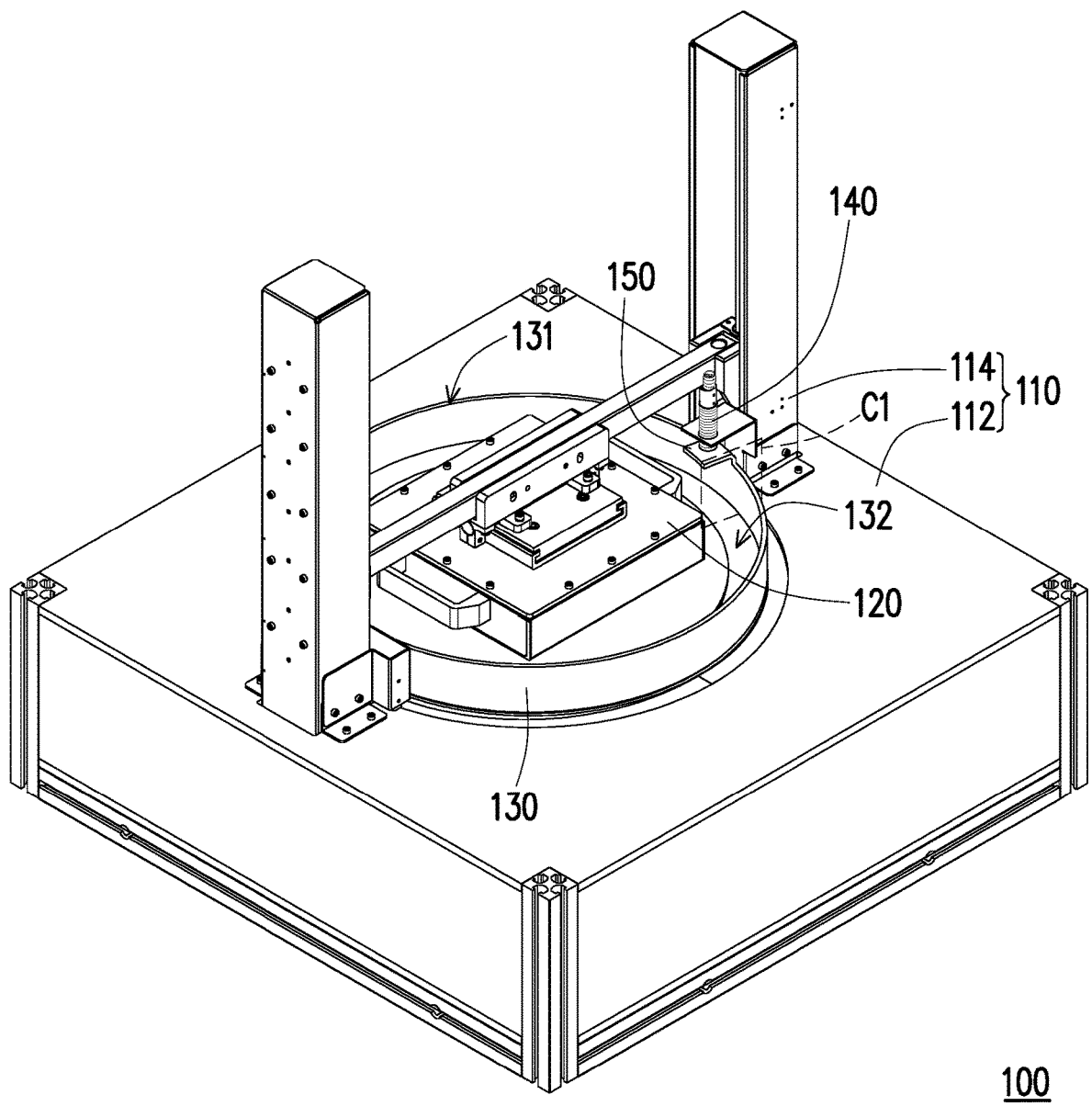
FIG. 1 is a schematic view of a three-dimensional printing device according to an embodiment of the present disclosure.
Figure 2:
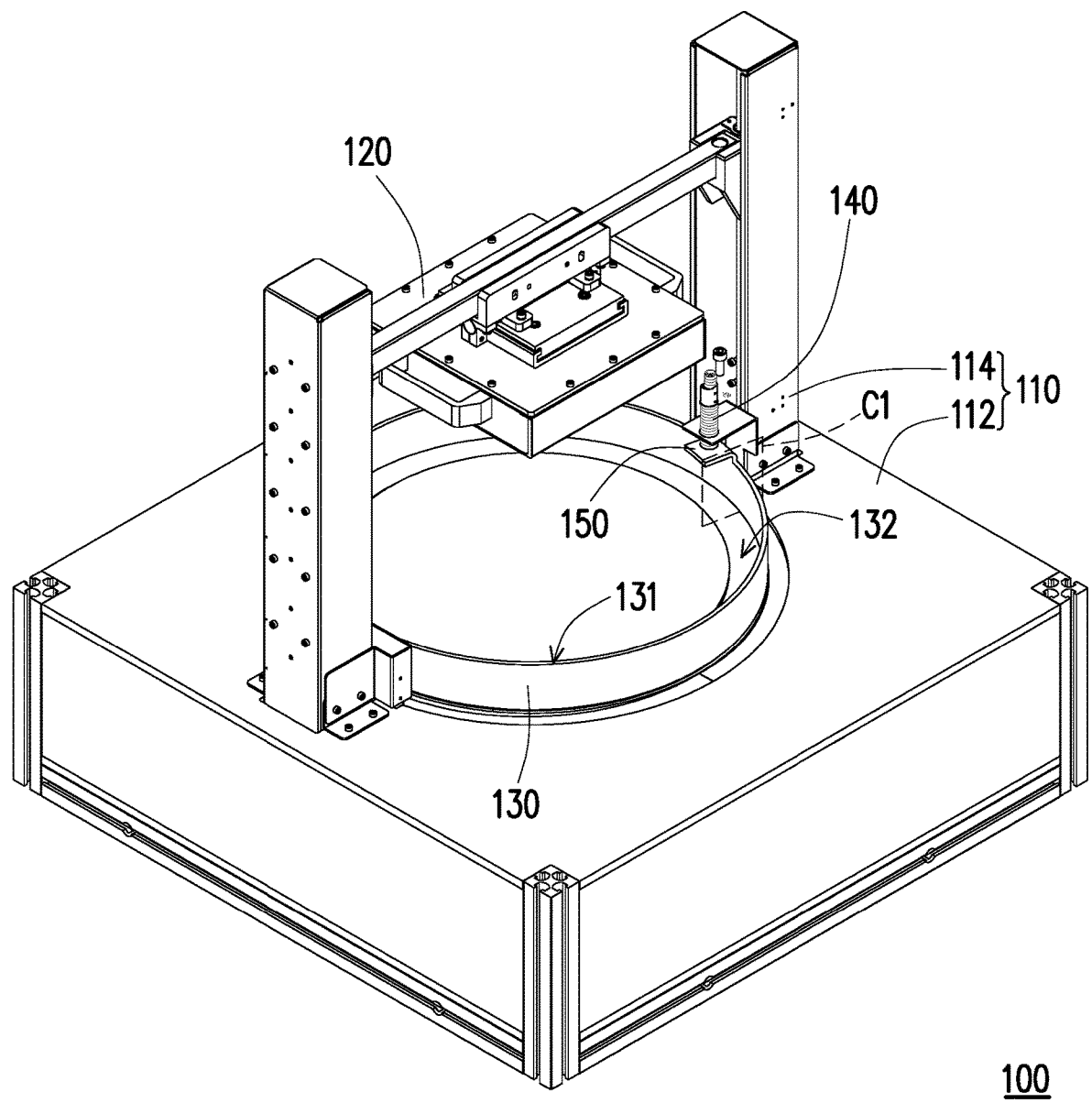
FIG. 2 is a schematic view of the three-dimensional printing device in FIG. 1 under another state.
Figure 3:
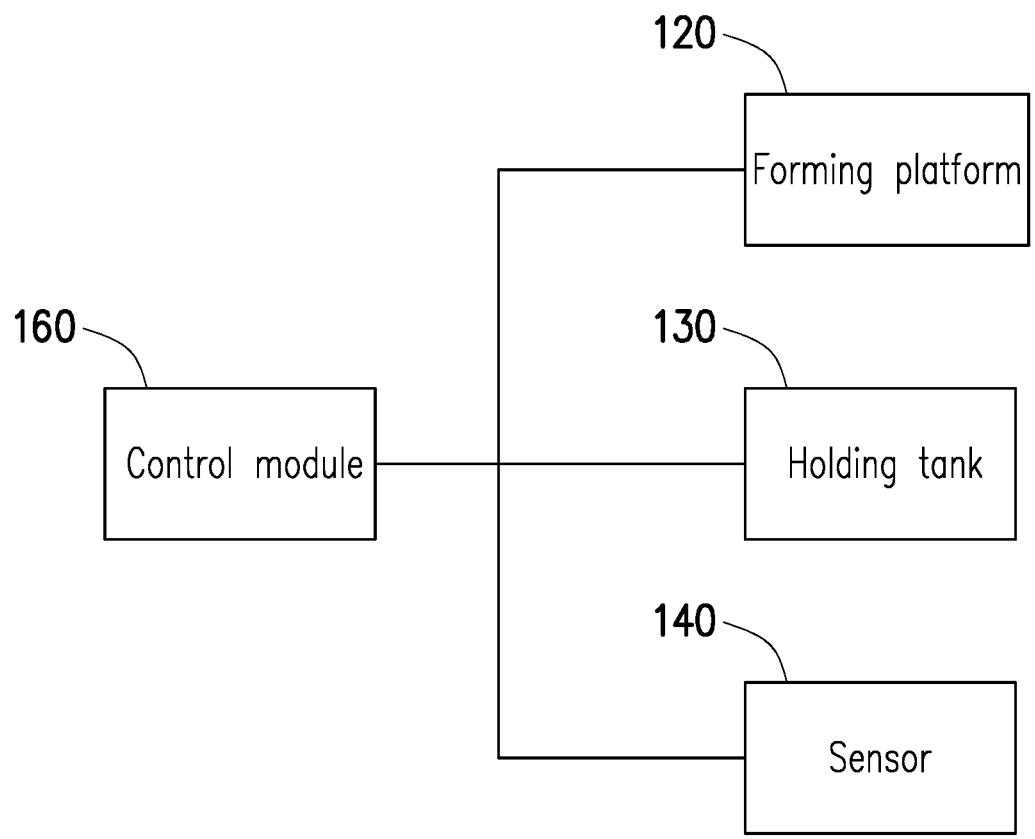
FIG. 3 depicts a driving relationship of partial components of the three-dimensional printing device in FIG. 1.
Figure 4:
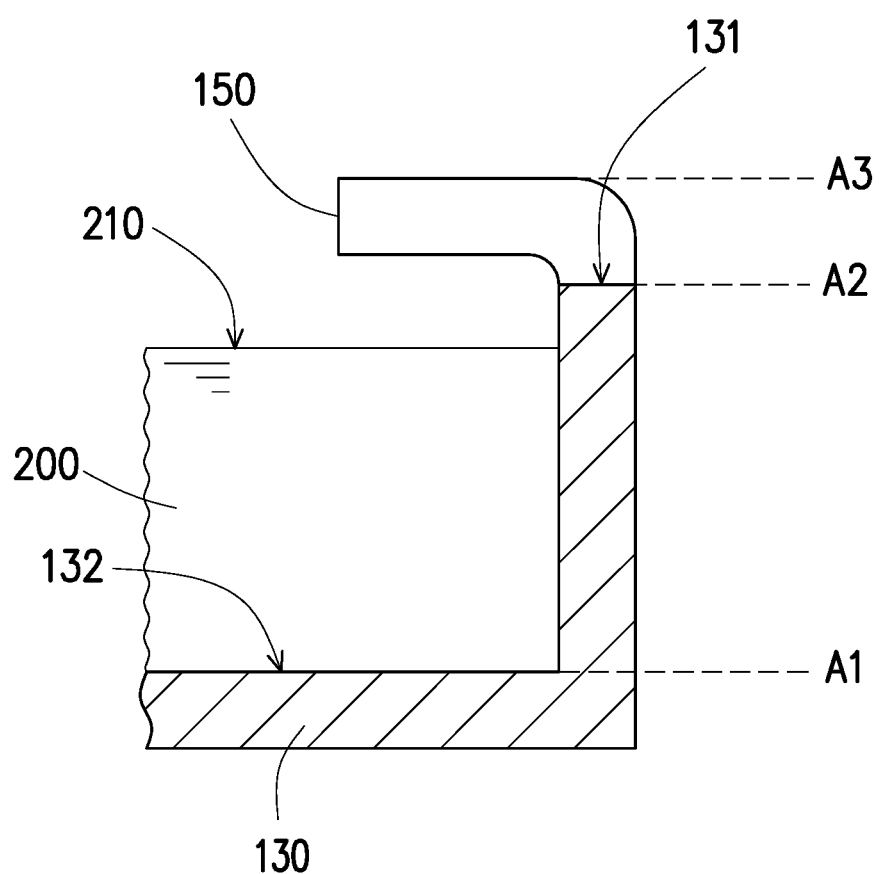
FIG. 4 is a partial cross-sectional view of a three-dimensional printing device.

FIG. 1 is a schematic view of a three-dimensional printing device according to an embodiment of the present disclosure. FIG. 2 is a schematic view of the three-dimensional printing device in FIG. 1 under another state. FIG. 3 depicts a driving relationship view of partial components of the three-dimensional printing device in FIG. 1. FIG. 4 is a partial cross-sectional view of a three-dimensional printing device. Referring to FIG. 1 to FIG. 4, in the present embodiment, a three-dimensional printing device 100 may be, for example, a stereolithography apparatus (SLA), including a body 110, a forming platform 120, a tank 130, a sensor 140, an origin target 150, and a control module 160. Meanwhile, the three-dimensional printing device 100 enables the control module 160 to drive a curing light source (not shown) disposed at the bottom of the tank 130 to provide curing light, and the curing light are enabled to penetrate through the transparent bottom of the tank 130 to irradiate and solidify a liquid forming material 200 in the tank 130.

In particular, the body 110 includes a base 112 and a gantry 114 disposed on the base 112, and the tank 130 is controlled by the control module 160 through a driving unit (not shown) thereof, so that the tank 130 is rotatably located on the base 112. Besides, the forming platform 120 is disposed on the portal frame 114 in an up-down moving manner, so that the forming platform 120 is controlled by the control module 160 through a driving unit (not shown) thereof, and the forming platform 120 can move in or out of the tank 130.

In a three-dimensional printing process, the control module 160 controls and drives the forming platform 120 to move in the tank 130 to contact (or immerse into) the liquid forming material 200 therein. Then, the control module 160 drives, according to relevant digital information about a contour of a three-dimensional object to be formed, the curing light source to provide curing light to perform scanning irradiation and solidification on the liquid forming material 200 at a specific position, so as to form a solidified layer between the forming platform 120 and the bottom of the tank 130, and thereafter when the forming platform 120 is in a fixed state, the tank 130 is driven to rotate, so as to disengage the solidified layer from the bottom of the tank 130. By repeating the foregoing actions such as solidification and disengagement, a plurality of solidified layers can be stacked on the forming platform 120 gradually until the three-dimensional object is completed. Here, it should be noted that the above description is only a brief description of relevant three-dimensional printing actions, and the other contents not mentioned can be known from the prior art, so the descriptions thereof are omitted herein.

Referring to FIG. 4 again, it is a partial cross-sectional view generated by the three-dimensional printing device 100 in FIG. 1 or FIG. 2 on a cross section C1. As mentioned above, in order to achieve monitoring of the reserves of liquid forming materials 200 stored in the tank 130 to serve as a criterion for judging whether liquid forming materials 200 needs to be refilled, the origin target 150 is disposed on the tank 130 to rotate along with the tank 130 in the present embodiment. Meanwhile, the sensor 140 is assembled on the base 112 of the body 110 through a support structure, extends into the tank 130, and is located above the liquid forming material 200, so as to accordingly provide a positioning function for the tank 130, thereby making the control module 160 judge position information of 3D printing to determine an appropriate printing area and position, and further avoiding whitening damage caused by the fact that the tank 130 performs 3D printing actions at a fixed position.

Herein, the sensor 140 is, for example, an ultrasonic liquid level meter or a laser liquid level meter for sensing the height of level 210 (or variation thereof) of the liquid forming material 200 in the tank 130, so as to allow the control module 160 to monitor the reserves of liquid forming materials 200 stored in the tank 130. Besides, the origin target 150 is a shielding piece disposed on the tank 130, which extends from the wall of the tank 130 to a place above the liquid forming material 200. In this way, when the origin target 150 rotates along with the tank 130, the sensor 140 is substantially located above a rotation path of the origin target 150.

More importantly, on the basis of the tank 130, the height of level 210 of the liquid forming material 200 in the tank 130 is limited by the volume depth of the tank 130. That is, a variable range between a height A1 and a height A2 exists between an internal bottom 132 (lowest point) and a top 131 (highest point) of the tank 130 (the internal bottom 132 has the height A1, the top 131 has the height A2, and the height of level 210 is equal to or less than the height A2 and is equal to or greater than the height A1). Meanwhile, the height of the origin target 150 relative to the tank 130 is beyond the variable range. In the present embodiment, the height of the origin target 150 is a height A3 shown in FIG. 4, that is, the height A3 of the origin target 150 relative to the tank 130 in the present embodiment is higher than a highest point of the tank 130, the highest point being the foregoing height A2 of the top 131.

Therefore, while the origin target 150 being rotated to a place below the sensor 140, the origin target 150 is sensed due to the fact that the height of the origin target 150 is different from the height of level 210 of the liquid forming material 200, and is not within the variable range of the height of level 210 obviously, so the control module 160 identifies and positions a rotation origin of the tank 130, that is, the origin target 150 is regarded as an origin of the tank 130 in a rotation process. Therefore, the control module 160 can provide a positioning function for the tank 130 on the basis of the origin target 150 so as to judge position information about 3D printing, the tank 130 is controlled to rotate to avoid the occurrence of the foregoing problem, thereby improving the 3D printing quality and prolonging the service life of the tank 130.

Based on the foregoing, the three-dimensional printing device 100 in the present disclosure senses the height of level 210 of the liquid forming material 200 in the tank 130 through a single sensor 140, and positions an origin of the tank 130 by identifying the origin target 150.

Figure 5:
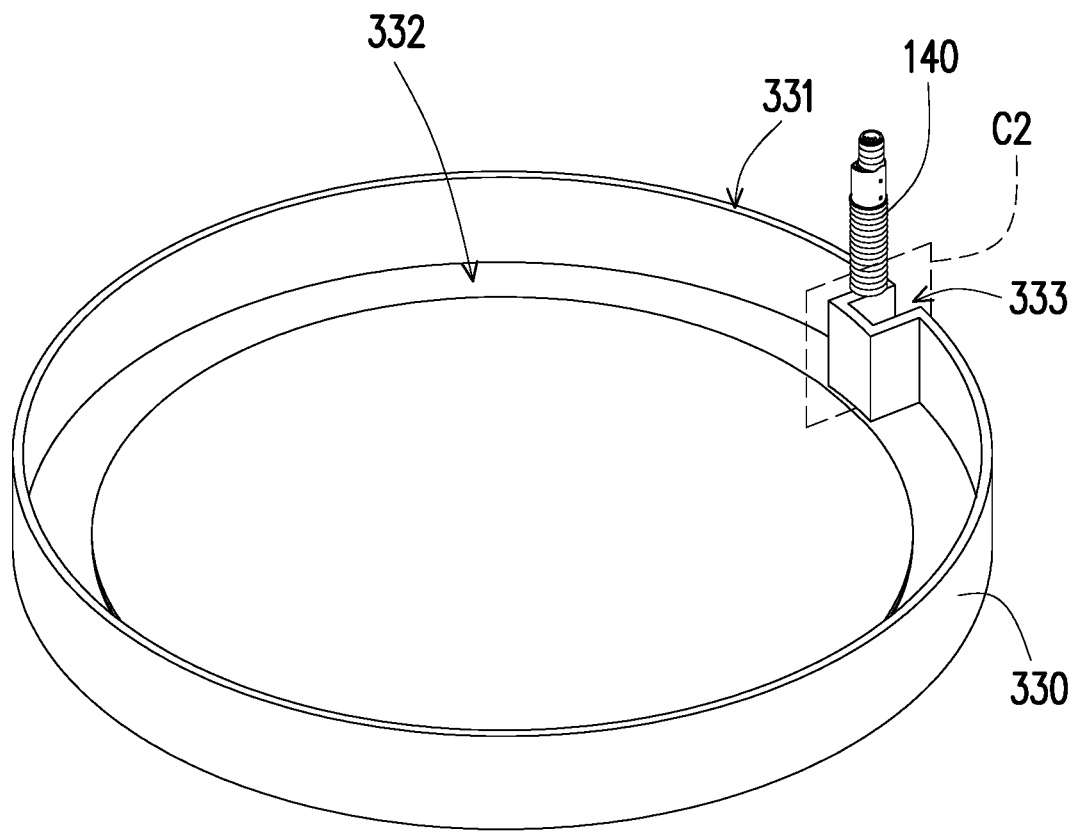
FIG. 5 is a partial schematic view of a tank according to another embodiment of the present disclosure.
Figure 6:
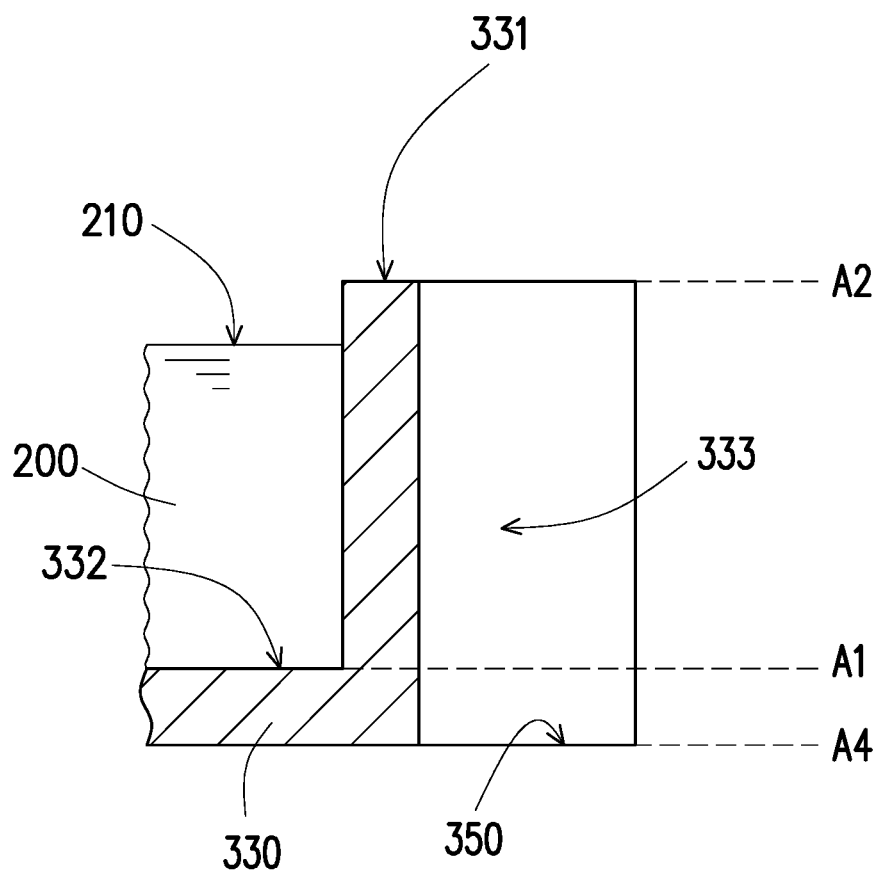
FIG. 6 is a partial cross-sectional view of the tank in FIG. 5.

FIG. 5 is a partial schematic view of a tank according to another embodiment of the present disclosure. FIG. 6 is a partial cross-sectional view of the tank in FIG. 5, which is generated on a cross section C2. Referring to FIG. 5 and FIG. 6, in the present embodiment, the tank 330 has a recess 333, and the sensor 140 in the foregoing embodiment is disposed above a rotation path of the recess 333 in the present embodiment. Besides, the tank 330 also has an external base 350 located underneath the recess 333. From FIG. 6, it can be obviously seen that the height of level 210 of the liquid forming material 200 in the tank 330 also has a variable range between the height A1 (internal bottom 332) and the height A2 (top 331). Different from the foregoing embodiment, the origin target in the present embodiment is the foregoing external base 350 located underneath the recess 333, it has a height A4, and the height A4 is less than the height A1. That is, the height A4 of the external substrate 350 in the tank 330 is lower than a lowest point of the tank 330, the lowest point being the internal bottom 332 of the tank 330.

Furthermore, the tank 330 further comprises a part adjacent to the recess 333, the part being the top 331 shown in FIG. 5. Therefore, during rotation, no matter whether the tank 330 passes through the sensor 140 in a sequence from the top 331 to the recess 333 or passes through the sensor 140 in a sequence from the recess 333 to the top 331, the height difference sensed by the sensor 140 is obtained by subtracting the height A4 from the height A2, which is obviously greater than the variable range (height A2 minus height A1) of the liquid height 210 in the presence of the external substrate 350 at the recess 333. Therefore, by sensing a sudden great change(or drop) of the height difference, the control module 160 positions the origin of the tank 330, that is, the external base 350 (be viewed as the origin target) is located underneath the recess 333.

Based on the foregoing, in the above embodiment of the present disclosure, according to the three-dimensional printing device, the same sensor is disposed above the liquid forming material, so that during the rotation of the tank, the liquid forming material and the origin target can be sensed by the sensor in turn. Therefore, the control module of the three-dimensional printing device can monitor the height of level of the liquid forming material accordingly, and can position the rotation origin of the tank according to a situation where the height of the origin target is different from the variable range of the height of level or the height difference between the origin target and the part adjacent to the tank is greater than the variable range when sensing the origin target, thereby serving as a reference for the control module to further control the rotation state of the tank.

Finally, it should be noted that each of the above embodiments is only used to describe the technical solution of the present invention, not intended to limit the present invention. Although the present invention has been described in detail with reference to each of the foregoing embodiments, a person of ordinary skill in the art should understand that the technical solution recorded in each of the foregoing embodiments can be still modified or some or all of technical features can be equivalently replaced. These modifications or replacements do not make the essence of the corresponding technical solution depart from the scope of the technical solution in each embodiment of the present invention.

What is claimed is:

1. A three-dimensional printing device, comprising:
a body;
a tank, rotatably assembled on the body, the tank being configured to be filled with a liquid forming material;
an origin target, disposed on the tank and rotating along with the tank;
a sensor, disposed on the body and located above the liquid forming material to sense a height of level of the liquid forming material in the tank; and
a control module, electrically connecting the tank and the sensor and driving the tank to rotate, the sensor being located above a rotation path of the origin target, and the control module sensing the origin target through the sensor and positioning a rotation origin of the tank when the origin target passes through a place below the sensor.

2. The three-dimensional printing device according to claim 1, wherein a height of the origin target relative to the tank is higher than a highest point of the tank, or a height of the origin target relative to the tank is lower than a lowest point of the tank.

3. The three-dimensional printing device according to claim 2, wherein the lowest point of the tank is an internal bottom of the tank.

4. The three-dimensional printing device according to claim 2, wherein the origin target is an external base of the tank.

5. The three-dimensional printing device according to claim 4, wherein the tank comprises a recess, and the external base is located underneath the recess.

6. The three-dimensional printing device according to claim 5, wherein the tank comprises, at least one part adjacent to the origin target on the rotation path of the origin target.

7. The three-dimensional printing device according to claim 6, wherein the at least one part is a top of the tank.

8. The three-dimensional printing device according to claim 1, wherein the height of level of the liquid forming material in the tank is within a variable range, and the height of the origin target relative to the tank is beyond the variable range of the height of level of the liquid forming material.

9. The three-dimensional printing device according to claim 8, wherein the variable range is greater than or equal to the height of an internal bottom of the tank, and is less than or equal to the height of a top of the tank.

10. The three-dimensional printing device according to claim 1, wherein the origin target is a shielding piece disposed on the tank, which extends from a wall of the tank to a place above the liquid forming material.

11. The three-dimensional printing device according to claim 1, wherein the sensor is an ultrasonic liquid level meter or a laser liquid level meter.

* * * * *